May 12, 1936.  E. DUHAIN  2,040,689

RAKE BAR AND TOOTH MOUNTING

Filed Feb. 11, 1935

Inventor
Ernest Duhain
By V. F. Lassagne
Atty.

UNITED STATES PATENT OFFICE 2,040,689

RAKE BAR AND TOOTH MOUNTING

Ernest Duhain, Croix, France, assignor to International Harvester Company, a corporation of New Jersey Application February 11, 1935, Serial No. 5,973
In France May 14, 1934

5 Claims. (Cl. 56—400)

This invention relates to side-delivery hay rakes, swath-turners and tedders of the type wherein dependent tines are mounted on rake-bars supported at their ends on revolving discs, spider arms or equivalent elements. The invention relates especially to the mounting of the tines on the tine-bars.

In such machines the tines are usually made from round steel wire and they are formed at their upper ends with horizontal coils to provide the necessary resilience. The rake-bars on which the tines are mounted are usually of the form of tubes and the coils of the tines are made to surround the tube and the tines are fixed in position by a screw or bolt passed through the end of the coil into the tube. The tines are sometimes formed in pairs, that is to say two tines formed from a single piece of wire. In this case the coils are disposed between the tines and the screw or bolt for fixing the construction to the tube is situated at the junction of the coils.

When these rakes are used for swath-turning or raking, the direction of rotation of the discs, or equivalent element employed for supporting the rake-bars, is in a certain direction, while when the rake is required for tedding the disc or equivalent is rotated in the opposite direction. In one case the pressure of the crop on the tines tends to tighten the coils around the bar while in the other case, it tends to unwind the coils with the result that a strain is put on the tempered coils and breakages of the tines may occur.

The tube forming a rake-bar may be made in one piece or it may be made in sections, but in either case, if a tine is injured or breaks all the tines from the broken one to the nearest end of the tube must be disconnected and taken off to replace the broken one and then all these tines must be replaced and reconnected.

In another known form of rake-bar, the bars are made of lengths of angle or channel iron and the tines are formed with axially disposed coils at their upper ends having a straightened threaded portion at the extremity which is passed through the rake-bar and secured thereto by nuts. In this case an individual tine may be dismounted and replaced on the bar without interfering with the others, but the arrangement has the disadvantage that the axial coils on the tines are liable to become pulled out and the tines are easily bent and, moreover, the fixing nuts become loose so that the tines are no longer securely held on the rake-bar.

It is the object of the present invention to provide a construction and mounting of the rake-bar and tines whereby these disadvantages are avoided. According to the invention the rake-bars are constructed of lengths of angle-iron or channel iron or from sheets bent to these shapes, of which one corner or angle is provided with slots adapted to receive a loop or eye formed between two horizontally disposed coils formed on the ends of a pair of tines made from a single piece of wire. The rake-bars are provided with holes in the centre of the slots which holes may be threaded or left clear so that the loop or eye between the coils may be secured to the bar by screws or bolts.

The arrangement will be clear from the accompanying drawing to which reference will now be made and wherein.

Figure 1:
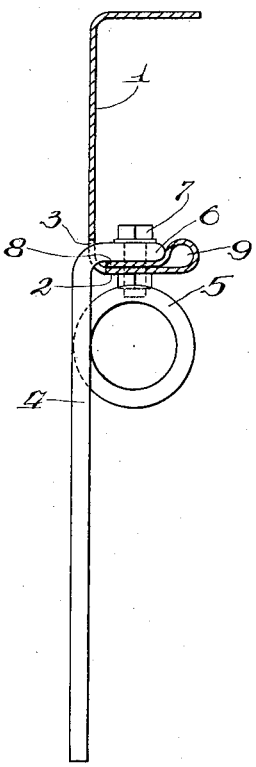
Figure 1 is a cross sectional view of a rake bar looking on the side of a pair of tines.
Figure 3:
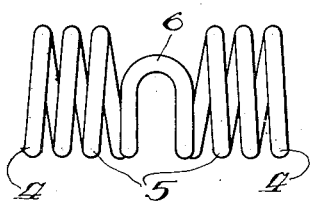
Figure 2:
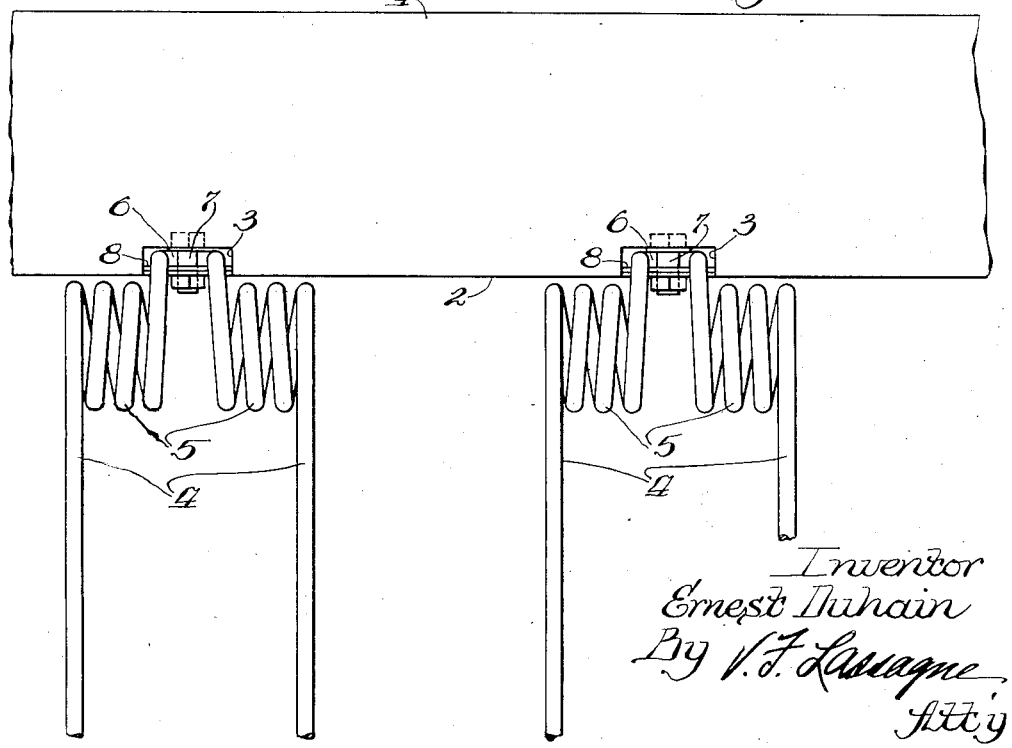
Figure 2 is a rear view of a portion of a rake-bar showing two pairs of tines secured thereon; and, Figure 3 is a plan view of an unmounted pair of tines.

The rake-bar 1 is constructed from angle or channel iron or from sheets bent to such shape and is disposed on the rake with a horizontal limb at the lower edge of the bar as shown in Figure 1. At the lower corner 2 near the vertical limb, slots 3 are provided equally spaced along the length of the bar.

The tines 4 are preferably made in pairs, as shown in the figures, from a single piece of wire having the upper ends formed with horizontal coils 5 disposed at right angles to the tines and situated between them. At the junction of the two coils, they are formed with a loop 6 which is adapted to fit into the slot 3 in the rake-bar. On the portion 2 of the rake bar in the part of the horizontal limb enclosed by the loop 6, the bars are provided with holes to receive bolts 7 passing through the loop 6 and the hole in order to secure the tines on the bar.

The horizontal limb of the rake bar on which the loops 6 rest is preferably bent over as indicated at 8 on Figure 1 and the bent portion may extend to the vertical limb of the bar as shown and it may be enlarged as shown at 9 to form a seat for the rear of the loop 6 of the tines.

It can now be seen that an improved rake tooth securing means has been provided which will overcome the troubles heretofore encountered.

It is the intention to cover all such changes and modifications as do not in material respects depart from the spirit and scope of the invention as hereinafter claimed.

What is claimed is:

1. A rake structure comprising a tooth carrying bar presenting angularly related sides, one of which is horizontally disposed with a slot formed in the bar at the angle, a rake tooth having an angularly related securing loop formed at one end, said loop being passed through the slot to overlie the horizontal side of the bar, and a bolt passed through the loop and horizontal side of the bar to secure the tooth to the bar.

2. A rake structure comprising a horizontally disposed channel-shaped tooth carrying bar presenting a vertical web and a lower horizontal flange, said bar having slots formed therein at spaced intervals at the angle between said web and said flange, rake teeth each having an angularly bent securing loop, which loop in each tooth is passed through a slot to cause the loop to lie flatly on the lower flange within the channel of the bar, and means passed through the eyes and lower flange for individually and removably securing the teeth to said bar.

3. A rake structure comprising a horizontal rake tooth carrying bar having an upright web and an angularly related horizontal flange with a slot formed at the angle between the web and flange, said flange being turned back on itself in the direction of the web to form a flange of double layers, a rake tooth having an angularly related securing loop passed through the slot in a manner to cause the loop to lie flatly on the turned back layer of the flange, and a bolt passed through the loop and flange layers to secure the tooth removably to the bar.

4. A rake structure comprising a horizontal rake tooth carrying bar having an upright web and an angularly related horizontal flange with a slot formed at the angle between the web and flange, said flange being turned back on itself in the direction of the web to form a laminated flange with a loop formed at the line of bending, a rake tooth having an angularly related securing eye passed through the slot in a manner to cause the eye to lie flatly on the laminated flange and in abutting relation against said loop, and a securing bolt passed through the eye and laminated flange for attaching the tooth to the bar.

5. A rake structure comprising a horizontal channel-shaped rake tooth carrying bar having an upright web and an angularly related lower horizontal flange bent back upon itself in the direction of the web to form a laminated flange, there being a number of spaced slots formed through the bar at the angle between the web and flange, rake teeth each having an angularly related securing eye, the said eyes adapted individually to be passed through a slot to overlie the laminated flange, and securing means passed through the eyes and flange to secure the teeth to the flange.

ERNEST DUHAIN.